US011965078B2

United States Patent
Onuki et al.

(10) Patent No.: US 11,965,078 B2
(45) Date of Patent: *Apr. 23, 2024

(54) CHLOROPRENE/UNSATURATED NITRILE COPOLYMER COMPOSITION AND VULCANIZED MOLDED OBJECT

(71) Applicant: DENKA COMPANY LIMITED, Tokyo (JP)

(72) Inventors: Suguru Onuki, Niigata (JP); Wataru Nishino, Niigata (JP); Atsunori Kondo, Niigata (JP); Yuhei Ishigaki, Niigata (JP); Naoki Kobayashi, Niigata (JP)

(73) Assignee: Denka Company Limited, Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 17/291,367

(22) PCT Filed: Nov. 6, 2019

(86) PCT No.: PCT/JP2019/043563
§ 371 (c)(1),
(2) Date: May 5, 2021

(87) PCT Pub. No.: WO2020/095967
PCT Pub. Date: May 14, 2020

(65) Prior Publication Data
US 2022/0010097 A1  Jan. 13, 2022

(30) Foreign Application Priority Data

Nov. 8, 2018  (JP) .................... 2018-210657

(51) Int. Cl.
| C08K 5/38 | (2006.01) |
| C08F 236/12 | (2006.01) |
| C08F 236/16 | (2006.01) |
| C08F 236/18 | (2006.01) |
| C08K 5/46 | (2006.01) |
| C08L 9/02 | (2006.01) |
| C08L 11/00 | (2006.01) |

(52) U.S. Cl.
CPC .............. C08K 5/38 (2013.01); C08F 236/12 (2013.01); C08F 236/16 (2013.01); C08F 236/18 (2013.01); C08K 5/46 (2013.01); C08L 9/02 (2013.01); C08L 11/00 (2013.01)

(58) Field of Classification Search
CPC ...... C08L 11/00; C08F 236/16; C08F 236/18; C08F 220/44; C08K 5/38; C08K 5/46
See application file for complete search history.

(56) References Cited

U.S. PATENT DOCUMENTS

| 3,340,088 A | 9/1967 | Pennisi et al. |
| 4,843,124 A * | 6/1989 | Wolfe, Jr. ............... C08L 11/00 |
| | | 525/173 |
| 2017/0292014 A1* | 10/2017 | Kitahara ............ C08K 5/0016 |

FOREIGN PATENT DOCUMENTS

| CA | 849610 A | 8/1970 | |
| CN | 1134425 A | 10/1996 | |
| DE | 196 49 331 A1 | 9/1997 | |
| EP | 3556786 A1 * | 10/2019 | ............... C08F 2/38 |
| EP | 3783040 A1 * | 2/2021 | ........... C08C 19/20 |
| GB | 858444 | 1/1961 | |
| JP | S55-099907 A | 7/1980 | |
| JP | S55-118903 A | 9/1980 | |
| JP | S55-145715 A | 11/1980 | |
| JP | H05-222244 A | 8/1993 | |
| JP | H09-003120 A | 1/1997 | |
| JP | 2001-011201 A | 1/2001 | |
| JP | 2003-147125 A | 5/2003 | |
| JP | 2012-082289 A | 4/2012 | |
| JP | 2013-534555 A | 9/2013 | |
| WO | WO-9504766 A1 * | 2/1995 | ........... C08F 236/18 |
| WO | WO 2011/163662 A | 12/2011 | |
| WO | WO 2013/015043 A1 | 1/2013 | |
| WO | WO-2018110369 A1 * | 6/2018 | ............... C08F 2/38 |
| WO | WO-2020044899 A1 * | 3/2020 | ........... C08C 19/20 |

OTHER PUBLICATIONS

International Bureau of WIPO, International Preliminary Report on Patentability in International Application No. PCT/JP2019/043563 (dated May 20, 2021).
European Patent Office, Extended European Search Report in European Application No. 19880999.8 (dated Dec. 21, 2021).
Ding, Shaolan, "Professional textbook for colleges and universities Leather Material Science", *China Light Industry Press*, Leather Material Science, pp. 115-116 (Jul. 1, 2017).
State Intellectual Property Office, Office Action issued in Chinese Patent Application No. 201980069956.8 (dated Sep. 16, 2022).
Japan Patent Office, International Search Report in International Application No. PCT/JP2019/043563 (dated Dec. 10, 2019).

* cited by examiner

*Primary Examiner* — Brieann R Johnston
(74) *Attorney, Agent, or Firm* — Leydig, Voit & Mayer, Ltd.

(57) ABSTRACT

A chloroprene-unsaturated nitrile copolymer composition containing 100 parts by mass of a chloroprene-unsaturated nitrile copolymer having 3 to 20% by mass of a structural unit derived from an unsaturated nitrile monomer, and 0.05 to 2.0 parts by mass of a xanthogen compound.

16 Claims, No Drawings

CHLOROPRENE/UNSATURATED NITRILE COPOLYMER COMPOSITION AND VULCANIZED MOLDED OBJECT

CROSS-REFERENCE TO RELATED APPLICATIONS

This patent application is the U.S. national phase of International Application No. PCT/JP2019/043563, filed on Nov. 6, 2019, which claims the benefit of Japanese Patent Application No. 2018-210657, filed Nov. 8, 2018, the disclosures of which are incorporated herein by reference in their entireties for all purposes.

TECHNICAL FIELD

The present invention relates to a chloroprene-unsaturated nitrile copolymer composition and a vulcanized molded article.

BACKGROUND ART

Chloroprene rubbers are excellent in mechanical properties, flame resistance, and the like, and thus are widely used as materials for industrial rubber products. However, the chloroprene rubbers have problems that oil resistance is not sufficient and the chloroprene rubbers cannot be used in oily environments such as the periphery of engines. As means for improving the oil resistance of chloroprene rubbers, a method for producing a chloroprene copolymer copolymerized with an unsaturated nitrile monomer has been known (see, for example, Patent Literature 1 below). This copolymer is vulcanized and molded and is suitably used for products such as transmission belts, conveyor belts, hoses, and wipers (see, for example, Patent Literatures 2 and 3 below).

CITATION LIST

Patent Literature

Patent Literature 1: Japanese Unexamined Patent Publication No. S55-145715
Patent Literature 2: Japanese Unexamined Patent Publication No. 2012-82289
Patent Literature 3: International Publication WO 2013/015043

SUMMARY OF INVENTION

Technical Problem

An aspect of the present invention is intended to provide a chloroprene-unsaturated nitrile copolymer composition with which a vulcanized molded article excellent in compression set at a high temperature and oil resistance is obtained. Another aspect of the present invention is intended to provide a vulcanized molded article of the above-described chloroprene-unsaturated nitrile copolymer composition.

Solution to Problem

An aspect of the present invention provides a chloroprene-unsaturated nitrile copolymer composition containing 100 parts by mass of a chloroprene-unsaturated nitrile copolymer having 3 to 20% by mass of a structural unit derived from an unsaturated nitrile monomer, and 0.05 to 2.0 parts by mass of a xanthogen compound.

Another aspect of the present invention provides a vulcanized molded article of the aforementioned chloroprene-unsaturated nitrile copolymer composition.

Advantageous Effects of Invention

According to an aspect of the present invention, it is possible to provide a chloroprene-unsaturated nitrile copolymer composition with which a vulcanized molded article excellent in compression set at a high temperature and oil resistance is obtained. According to another aspect of the present invention, it is possible to provide a vulcanized molded article of the above-described chloroprene-unsaturated nitrile copolymer composition. The aforementioned chloroprene-unsaturated nitrile copolymer composition, and a vulcanizate and a vulcanized molded article thereof can be used as materials for rubber products used in a transmission belt, a conveyor belt, a hose, a wiper, a seal material (such as packing and gasket), a roll, an air spring, a vibration-proof material, an adhesive, a boot, a rubberized fabric, a sponge, a rubber lining, and the like.

DESCRIPTION OF EMBODIMENTS

Hereinafter, embodiments for carrying out the present invention will be specifically described. Note that, the present invention is not limited to embodiments described below.

In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in Examples. Materials listed as examples in the present specification can be used singly or in combinations of two or more kinds thereof, unless otherwise specified. In a case where a plurality of substances corresponding to each component exist in the composition, the content of each component in the composition means the total amount of the plurality of substances that exist in the composition, unless otherwise specified.

<Chloroprene-Unsaturated Nitrile Copolymer Composition>

A chloroprene-unsaturated nitrile copolymer composition of the present embodiment contains a chloroprene-unsaturated nitrile copolymer and a xanthogen compound. According to the chloroprene-unsaturated nitrile copolymer composition of the present embodiment, it is possible to obtain a vulcanizate and a vulcanized molded article which are excellent in compression set at a high temperature (for example, 130° C.) and oil resistance. The vulcanizate of the present embodiment is a vulcanizate of the chloroprene-unsaturated nitrile copolymer composition of the present embodiment and can be obtained by vulcanizing the chloroprene-unsaturated nitrile copolymer composition of the present embodiment.

Furthermore, according to the chloroprene-unsaturated nitrile copolymer composition of the present embodiment, it is possible to obtain a vulcanizate and a vulcanized molded article which are excellent in oil resistance, without impairing scorch time and compression set at a high temperature. According to the chloroprene-unsaturated nitrile copolymer composition of the present embodiment, it is also possible to obtain a vulcanizate and a vulcanized molded article which are excellent in compression set at a high temperature and oil resistance while obtaining excellent cold resistance (brittle temperature).

(Chloroprene-Unsaturated Nitrile Copolymer)

The chloroprene-unsaturated nitrile copolymer has a structural unit derived from a chloroprene monomer (chloroprene monomer unit) and a structural unit derived from an unsaturated nitrile monomer (unsaturated nitrile monomer unit). The chloroprene-unsaturated nitrile copolymer can be obtained by copolymerizing a chloroprene monomer and an unsaturated nitrile monomer. The chloroprene-unsaturated nitrile copolymer has 3 to 20% by mass of the structural unit derived from the unsaturated nitrile monomer on the basis of the total amount of the structural units constituting the chloroprene-unsaturated nitrile copolymer. The chloroprene-unsaturated nitrile copolymer may have 3 to 20% by mass of the structural unit derived from the unsaturated nitrile monomer in the main chain.

Examples of the unsaturated nitrile monomer include acrylonitrile, methacrylonitrile, ethacrylonitrile, and phenylacrylonitrile. The unsaturated nitrile monomer can be used alone or in combination of two or more kinds thereof. The unsaturated nitrile monomer preferably contains acrylonitrile from the viewpoint of easily obtaining excellent easiness of production and oil resistance.

The amount of the structural unit derived from the unsaturated nitrile monomer contained in the chloroprene-unsaturated nitrile copolymer is 3 to 20% by mass on the basis of the total amount of the chloroprene-unsaturated nitrile copolymer. When the amount of the structural unit derived from the unsaturated nitrile monomer is less than 3% by mass, the oil resistance of a vulcanizate and a vulcanized molded article to be obtained is not improved. When the amount of the structural unit derived from the unsaturated nitrile monomer is more than 20% by mass, the compression set at a high temperature and the cold resistance of a vulcanizate and a vulcanized molded article to be obtained are deteriorated.

The amount of the structural unit derived from the unsaturated nitrile monomer is preferably 5% by mass or more, more preferably 7% by mass or more, further preferably 8% by mass or more, particularly preferably 9% by mass or more, and extremely preferably 10% by mass or more, from the viewpoint of easily obtaining excellent oil resistance. The amount of the structural unit derived from the unsaturated nitrile monomer is preferably less than 20% by mass, more preferably 17% by mass or less, further preferably 15% by mass or less, particularly preferably 12% by mass or less, extremely preferably less than 11% by mass, and highly preferably 10% by mass or less, from the viewpoint of easily obtaining excellent compression set and cold resistance. From these viewpoints, the amount of the structural unit derived from the unsaturated nitrile monomer is preferably 5 to 17% by mass and more preferably 9 to 17% by mass. The amount of the structural unit derived from the unsaturated nitrile monomer is preferably more than 10% by mass, more preferably 12% by mass or more, further preferably 15% by mass or more, and particularly preferably 18% by mass or more, from the viewpoint of easily obtaining further excellent oil resistance. The amount of the structural unit derived from the unsaturated nitrile monomer is preferably less than 10% by mass, more preferably 8% by mass or less, further preferably 6% by mass or less, particularly preferably 5% by mass or less, and extremely preferably 4% by mass or less, from the viewpoint of easily obtaining further excellent compression set and cold resistance and the viewpoint of easily obtaining excellent scorch time.

The amount of the structural unit derived from the unsaturated nitrile monomer contained in the chloroprene-unsaturated nitrile copolymer can be calculated from the content of the nitrogen atom in the copolymer. Specifically, the amount of the structural unit derived from the unsaturated nitrile monomer can be calculated by measuring the content of the nitrogen atom in 100 mg of the chloroprene-unsaturated nitrile copolymer using an element analysis apparatus (SUMIGRAPH 220F: manufactured by Sumika Chemical Analysis Service, Ltd.). The measurement of element analysis can be performed under the following conditions. For example, as for the electric furnace temperature, a reaction furnace, a reduction furnace, a column temperature, and a detector temperature are set at 900° C., 600° C., 70° C., and 100° C., respectively, oxygen is flowed as a combustion gas at 0.2 ml/min, and helium is flowed as a carrier gas at 80 ml/min. A calibration curve can be made using aspartic acid whose nitrogen content is known (10.52%) as a standard substance.

The amount of the structural unit derived from the chloroprene monomer is preferably in the following range on the basis of the total amount of the chloroprene-unsaturated nitrile copolymer. The amount of the structural unit derived from the chloroprene monomer is preferably 80% by mass or more, more preferably more than 80% by mass, further preferably 83% by mass or more, particularly preferably 85% by mass or more, extremely preferably 88% by mass or more, highly preferably more than 89% by mass, and even more preferably 90% by mass or more, from the viewpoint of easily obtaining excellent compression set and cold resistance. The amount of the structural unit derived from the chloroprene monomer is preferably 97% by mass or less, more preferably 95% by mass or less, further preferably 93% by mass or less, particularly preferably 92% by mass or less, extremely preferably 91% by mass or less, and highly preferably 90% by mass or less, from the viewpoint of easily obtaining excellent oil resistance. From these viewpoints, the amount of the structural unit derived from the chloroprene monomer is preferably 80 to 97% by mass. The amount of the structural unit derived from the chloroprene monomer is preferably less than 90% by mass, more preferably 88% by mass or less, further preferably 85% by mass or less, and particularly preferably 82% by mass or less, from the viewpoint of easily obtaining further excellent oil resistance. The amount of the structural unit derived from the chloroprene monomer is preferably more than 90% by mass, more preferably 92% by mass or more, further preferably 94% by mass or more, particularly preferably 95% by mass or more, and extremely preferably 96% by mass or more, from the viewpoint of easily obtaining further excellent compression set and cold resistance and the viewpoint of easily obtaining excellent scorch time.

A monomer copolymerizable with the chloroprene monomer is not limited to the unsaturated nitrile monomer. Examples of the monomer copolymerizable with the chloroprene monomer include 2,3-dichloro-1,3-butadiene, 1-chloro-1,3-butadiene, styrene, isoprene, butadiene, acrylic acid, esters of acrylic acid, methacrylic acid, and esters of methacrylic acid. The amount of the structural unit derived from 1-chloro-1,3-butadiene contained in the chloroprene-unsaturated nitrile copolymer may be less than 1% by mass on the basis of the total amount of the chloroprene-unsaturated nitrile copolymer.

The polymer structure of the chloroprene-unsaturated nitrile copolymer is not particularly limited, and may be a block copolymer or a statistical copolymer.

A statistical copolymer of the chloroprene monomer and the unsaturated nitrile monomer can be produced, for example, by performing continuous addition or 10 cycles or more of intermittent portionwise addition of the chloroprene monomer after initiation of a polymerization reaction. At this time, the amount of the chloroprene monomer to be added during time period dt(n+1) between time t(n) and time t(n+1) can be determined on the basis of the total quantity of polymerization conversion of the chloroprene monomer and the unsaturated nitrile monomer during time period dt(n) between time t(n−1) and time t(n) when the time at which the polymerization reaction is initiated is designated as t(0) and "n" is an integer of 1 or more, and the ratio of the unreacted chloroprene monomer and unsaturated nitrile monomer can be maintained to be constant.

The statistical copolymer means a copolymer which can be described on the basis of Bernoulli's statistic model or a primary or secondary Markov's statistic model as described in J. C. Randall "POLYMER SEQUENCE DETERMINATION, Carbon-13 NMR Method" Academic Press, New York, 1977, pages 71-78. In a case where the statistical copolymer of the chloroprene monomer and the unsaturated nitrile monomer is constituted from a binary system monomer, in terms of obtaining a statistical copolymer, it is preferable that, with regard to reactivity ratios r1 and r2 when assuming that a ratio of the chloroprene monomer and the unsaturated nitrile monomer at the time of polymerization initiation as d[M1]/d[M2] in the following Mayo-Lewis Formula (I) and assuming that the chloroprene monomer as M1 defined in the following Mayo-Lewis Formula (I), r1 is in a range of 0.3 to 3000 and r2 is in a range of $10^{-5}$ to 3.0.

[Mathematical Formula 1]

$$\frac{d\ [M1]}{d\ [M2]} = \frac{[M1]}{[M2]} \times \frac{r_1\ [M1] + [M2]}{[M1] + r_2\ [M2]} \quad (I)$$

The chloroprene-unsaturated nitrile copolymer can be obtained, for example, by emulsion polymerization. A polymerization initiator used in the emulsion polymerization is not particularly limited, and a known polymerization initiator, which is generally used in the emulsion polymerization of the chloroprene monomer, can be used. Examples of the polymerization initiator include organic peroxides such as potassium persulfate, ammonium persulfate, sodium persulfate, hydrogen peroxide, and t-butyl hydroperoxide.

An emulsifier used in the emulsion polymerization is not particularly limited, and a known emulsifier, which is generally used in the emulsion polymerization of the chloroprene monomer, can be used. Examples of the emulsifier include alkali metal salts of saturated or unsaturated aliphatic acids having 6 to 22 carbon atoms, alkali metal salts of rosin acids or disproportioned rosin acids (for example, potassium rosinate), and alkali metal salts of β-naphthalenesulfonic acid-formalin condensates (for example, sodium salt).

A molecular weight adjustor used in the emulsion polymerization is not particularly limited, and a known molecular weight adjustor, which is generally used in the emulsion polymerization of the chloroprene monomer, can be used. Examples of the molecular weight adjustor include long chain alkylmercaptans such as n-dodecylmercaptan, t-dodecylmercaptan, and n-octylmercaptan; xanthogen compounds such as diisopropylxanthogen disulfide and diethylxanthogen disulfide; iodoform; and thiocarbonyl compounds such as benzyl 1-pyrroldithiocarbamate (also known as benzyl 1-pyrrolcarbodithioate), benzylphenyl carbodithioate, 1-benzyl-N,N-dimethyl-4-aminodithiobenzoate, 1-benzyl-4-methoxydithiobenzoate, 1-phenylethylimidazole dithiocarbamate (also known as 1-phenylethylimidazole carbodithioate), benzyl-1-(2-pyrrolidinone)dithiocarbamate (also known as benzyl-1-(2-pyrrolidinone)carbodithioate), benzylphthalimidyl dithiocarbamate (also known as benzylphthalimidyl carbodithioate), 2-cyanoprop-2-yl-1-pyrroldithiocarbamate (also known as 2-cyanoprop-2-yl-1-pyrrolcarbodithioate), 2-cyanobut-2-yl-1-pyrroldithiocarbamate (also known as 2-cyanobut-2-yl-1-pyrrolcarbodithioate), benzyl-1-imidazole dithiocarbamate (also known as benzyl-1-imidazole carbodithioate), 2-cyanoprop-2-yl-N,N-dimethyl dithiocarbamate, benzyl-N,N-diethyl dithiocarbamate, cyanomethyl-1-(2-pyrrolidone)dithiocarbamate, 2-(ethoxycarbonylbenzyl)prop-2-yl-N,N-diethyl dithiocarbamate, 1-phenyl ethyl dithiobenzoate, 2-phenylprop-2-yldithiobenzoate, 1-aceto-1-yl-ethyl dithiobenzoate, 1-(4-methoxyphenyl)ethyl dithiobenzoate, benzyl dithioacetate, ethoxycarbonylmethyl dithioacetate, 2-(ethoxycarbonyl)prop-2-yldithiobenzoate, 2-cyanoprop-2-yldithiobenzoate, t-butyl dithiobenzoate, 2,4,4-trimethylpenta-2-yldithiobenzoate, 2-(4-chlorophenyl)-prop-2-yldithiobenzoate, 3-vinylbenzyl dithiobenzoate, 4-vinylbenzyl dithiobenzoate, benzyl diethoxyphosphinyl dithioformate, t-butyltrithioperbenzoate, 2-phenylprop-2-yl-4-chlorodithiobenzoate, naphthalene-1-carboxylic acid-1-methyl-1-phenyl-ethyl ester, 4-cyano-4-methyl-4-thiobenzyl sulfanyl butyric acid, dibenzyl tetrathioterephthalate, carboxymethyl dithiobenzoate, dithiobenzoate terminal-carrying poly(ethylene oxide), 4-cyano-4-methyl-4-thiobenzylsulfanyl butyrate terminal-carrying poly(ethylene oxide), 2-[(2-phenylethanethioyl)sulfanyl]propanoic acid, 2-[(2-phenylethanethioyl)sulfanyl] succinic acid, potassium 3,5-dimethyl-1H-pyrazol-1-carbodithioate, cyanomethyl-3,5-dimethyl-1H-pyrazol-1-carbodithioate, cyanomethyl methyl-(phenyl) dithiocarbamate, benzyl-4-chlorodithiobenzoate, phenyl methyl-4-chlorodithiobenzoate, 4-nitrobenzyl-4-chlorodithiobenzoate, phenyl prop-2-yl-4-chlorodithiobenzoate, 1-cyano-1-methyl ethyl-4-chlorodithiobenzoate, 3-chloro-2-butenyl-4-chlorodithiobenzoate, 2-chloro-2-butenyl dithiobenzoate, benzyl dithioacetate, 3-chloro-2-butenyl-1H-pyrrol-1-dithiocarboxylic acid, 2-cyanobutane-2-yl-4-chloro-3,5-dimethyl-1H-pyrazol-1-carbodithioate, cyanomethyl methyl(phenyl)carbamodithioate, 2-cyano-2-propyldodecyl trithiocarbonate, dibenzyl trithiocarbonate, butylbenzyl trithiocarbonate, 2-[[(butylthio)thioxomethyl]thio]propionic acid, 2-[[(dodecylthio)thioxomethyl]thio]propionic acid, 2-[[(butylthio)thioxomethyl]thio]succinic acid, 2-[[(dodecylthio)thioxomethyl]thio]succinic acid, 2-[[(dodecylthio)thioxomethyl]thio]-2-methyl propionic acid, 2,2'-[carbonothioylbis(thio)]bis[2-methyl propionic acid], 2-amino-1-methyl-2-oxoethylbutyl trithiocarbonate, benzyl-2-[(2-hydroxyethyl)amino]-1-methyl-2-oxoethyl trithiocarbonate, 3-[[[(t-butyl)thio]thioxomethyl]thio]propionic acid, cyanomethyldodecyl trithiocarbonate, diethylaminobenzyl trithiocarbonate, and dibutylaminobenzyl trithiocarbonate.

The polymerization temperature and the final conversion rate of the monomer are not particularly limited, and the polymerization temperature is preferably 0° C. to 50° C. and more preferably 20° C. to 50° C. It is preferable to perform polymerization such that the final conversion rate of the monomer falls within a range of 40 to 95% by mass. In order to adjust the final conversion rate, when the conversion rate becomes a desired value, a polymerization inhibitor for terminating the polymerization reaction may be added to terminate the polymerization.

A polymerization inhibitor is not particularly limited, and a known polymerization inhibitor, which is generally used in the emulsion polymerization of the chloroprene monomer, can be used. Examples of the polymerization inhibitor include phenothiazine (thiodiphenylamine), 4-tertiary-butylcatechol, and 2,2-methylenebis-4-methyl-6-tertiary-butylphenol.

The chloroprene-unsaturated nitrile copolymer can be obtained, for example, by removing the unreacted monomer by a steam stripping method, then adjusting the pH of the latex, and performing steps of freeze coagulation, washing with water, hot air drying, and the like of ordinary methods.

The chloroprene-unsaturated nitrile copolymer is classified into a mercaptan-modified type, a xanthogen-modified type, a sulfur-modified type, a dithiocarbonate-based type, a trithiocarbonate-based type, and a carbamate-based type, depending on the types of molecular weight adjustors.

(Xanthogen Compound)

The chloroprene-unsaturated nitrile copolymer composition of the present embodiment contains a xanthogen compound. The xanthogen compound may be used as a molecular weight adjustor at the time of the aforementioned emulsion polymerization. Furthermore, the xanthogen compound can accelerate the vulcanization of the chloroprene-unsaturated nitrile copolymer composition by mixing (post-adding) the xanthogen compound with (to) the chloroprene-unsaturated nitrile copolymer.

Examples of the xanthogen compound include xanthic acid, xanthate, and a compound having a group obtained by substitution of the hydrogen atom of xanthic acid (a group represented by "ROC(=S)S—"; R represents an arbitrary substituent). Examples of the xanthogen compound include alkylxanthic acid and a salt thereof, allylxanthic acid and a salt thereof, and a xanthogen disulfide compound. Examples of the salt include a lithium salt, a sodium salt, and a potassium salt. The xanthogen compound can be used alone or in combination of two or more kinds thereof.

Examples of the alkylxanthic acid include methylxanthic acid, ethylxanthic acid, n-propylxanthic acid, isopropylxanthic acid, n-butylxanthic acid, sec-butylxanthic acid, n-hexylxanthic acid, and n-octylxanthic acid. Examples of the allylxanthic acid include phenylxanthic acid and p-tolylxanthic acid.

The xanthogen disulfide compound is a compound having a structure represented by "$R^{a}OC(=S)S—S(S=)COR^{b}$" ($R^{a}$ and $R^{b}$ each independently represent an arbitrary substituent). Examples of the xanthogen disulfide compound include dimethylxanthogen disulfide, diethylxanthogen disulfide, dipropylxanthogen disulfide, diisopropylxanthogen disulfide, dibutylxanthogen disulfide, dipentylxanthogen disulfide, dihexylxanthogen disulfide, diheptylxanthogen disulfide, dioctylxanthogen disulfide, diphenylxanthogen disulfide, and di-p-tolylxanthogen disulfide.

The xanthogen compound preferably includes a compound represented by General Formula (1) below, from the viewpoint of easily obtaining excellent scorch time, compression set at a high temperature, oil resistance, and a brittle temperature.

[Chemical Formula 1]

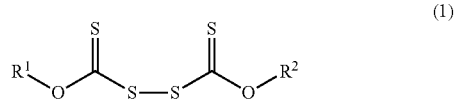

(1)

[In the formula, $R^1$ and $R^2$ each independently represent a hydrogen atom or an alkyl group having 1 to 8 carbon atoms; and the hydrogen atom of the alkyl group may be substituted with a substituent.]

The number of carbon atoms of the alkyl group in the compound represented by General Formula (1) is preferably 1 to 4 and more preferably 2 or 3, from the viewpoint of easily obtaining excellent scorch time, compression set at a high temperature, oil resistance, and a brittle temperature.

Examples of the compound represented by General Formula (1) include xanthogen disulfide, dimethylxanthogen disulfide, diethylxanthogen disulfide, dipropylxanthogen disulfide, diisopropylxanthogen disulfide, dibutylxanthogen disulfide, dipentylxanthogen disulfide, dihexylxanthogen disulfide, diheptylxanthogen disulfide, and dioctylxanthogen disulfide. From the viewpoint of easily obtaining excellent scorch time, compression set at a high temperature, oil resistance, and a brittle temperature, the xanthogen compound preferably includes a compound in which $R^1$ and $R^2$ in General Formula (1) are an alkyl group having 1 to 8 carbon atoms, and more preferably includes at least one compound selected from diethylxanthogen disulfide and diisopropylxanthogen disulfide. The compound represented by General Formula (1) can be used alone or in combination of two or more kinds thereof.

The content of the xanthogen compound is 0.05 to 2.0 parts by mass with respect to 100 parts by mass of the chloroprene-unsaturated nitrile copolymer. When the content of the xanthogen compound is less than 0.05 parts by mass, an effect of accelerating the vulcanization of the chloroprene-unsaturated nitrile copolymer is low, and compression set may not be improved. When the content of the xanthogen compound is more than 2.0 parts by mass, vulcanization insufficiency of a vulcanizate and a vulcanized molded article to be obtained may occur, and compression set may not be improved.

The content of the xanthogen compound is preferably 0.1 parts by mass or more, more preferably 0.2 parts by mass or more, further preferably 0.3 parts by mass or more, particularly preferably 0.4 parts by mass or more, and extremely preferably 0.5 parts by mass or more, from the viewpoint of easily improving compression set and the viewpoint of easily obtaining excellent scorch time. The content of the xanthogen compound is preferably 1.75 parts by mass or less, more preferably 1.5 parts by mass or less, further preferably 1.25 parts by mass or less, particularly preferably 1.0 part by mass or less, extremely preferably less than 1.0 part by mass, highly preferably 0.8 parts by mass or less, even more preferably 0.6 parts by mass or less, and further preferably 0.5 parts by mass or less, from the viewpoint of easily improving compression set. From these viewpoints, the content of the xanthogen compound is preferably 0.1 to 2.0 parts by mass and more preferably 0.3 to 1.0 part by mass.

The content of the xanthogen compound is preferably more than 0.5 parts by mass, more preferably 0.8 parts by mass or more, further preferably 1.0 part by mass or more, particularly preferably more than 1.0 part by mass, extremely preferably 1.2 parts by mass or more, highly preferably 1.5 parts by mass or more, and even more preferably 1.8 parts by mass or more, from the viewpoint of easily obtaining further excellent scorch time.

(Sulfur-Based Vulcanization Accelerator)

The chloroprene-unsaturated nitrile copolymer composition of the present embodiment may contain a sulfur-based vulcanization accelerator (a vulcanization accelerator containing a sulfur atom). For example, the sulfur-based vulcanization accelerator can accelerate the vulcanization of the chloroprene-unsaturated nitrile copolymer by a synergic effect with the aforementioned xanthogen compound.

Examples of the sulfur-based vulcanization accelerator include 3-methylthiazolidine-2-thione, a thiourea-based vulcanization accelerator, a thiazole-based vulcanization accelerator, and a thiuram-based vulcanization accelerator. The sulfur-based vulcanization accelerator can be used alone or in combination of two or more kinds thereof.

Examples of the thiourea-based vulcanization accelerator include triethyl thiourea (for example, 1,1,3-trimethyl thiourea), ethylene thiourea, diethyl thiourea, trimethyl thiourea, and N, N'-diphenyl thiourea. From the viewpoint of easily obtaining excellent scorch time, compression set at a high temperature, oil resistance, and a brittle temperature, the thiourea-based vulcanization accelerator preferably includes at least one compound selected from trimethyl thiourea and ethylene thiourea. Examples of the thiazole-based vulcanization accelerator include a 1,2-dimercapto-1,3,4-thiadiazole derivative.

From the viewpoint of easily obtaining excellent scorch time, compression set at a high temperature, oil resistance, and a brittle temperature, the sulfur-based vulcanization accelerator preferably includes at least one compound selected from 3-methylthiazolidine-2-thione, 1,1,3-trimethyl thiourea, and ethylene thiourea.

The content of the sulfur-based vulcanization accelerator is preferably in the following range with respect to 100 parts by mass of the chloroprene-unsaturated nitrile copolymer, from the viewpoint of effectively promoting the vulcanization of the chloroprene-unsaturated nitrile copolymer, the viewpoint of easily obtaining an effect of suppressing the vulcanization insufficiency of a vulcanizate and a vulcanized molded article to be obtained and improving compression set, and the viewpoint of easily obtaining excellent scorch time. The content of the sulfur-based vulcanization accelerator is preferably 0.5 parts by mass or more, more preferably 0.75 parts by mass or more, and further preferably 1.0 part by mass or more. The content of the sulfur-based vulcanization accelerator is preferably 5.0 parts by mass or less, more preferably 4.5 parts by mass or less, further preferably 4.0 parts by mass or less, particularly preferably 3.5 parts by mass or less, extremely preferably 3.0 parts by mass or less, highly preferably 2.5 parts by mass or less, even more preferably 2.0 parts by mass or less, and further preferably 1.5 parts by mass or less. From these viewpoints, the content of the sulfur-based vulcanization accelerator is preferably 0.5 to 5 parts by mass, more preferably 0.75 to 3.0 parts by mass, and further preferably 1.0 to 2.0 parts by mass.

(Other Components)

The chloroprene-unsaturated nitrile copolymer composition of the present embodiment may contain other components other than the chloroprene-unsaturated nitrile copolymer, the xanthogen compound, and the sulfur-based vulcanization accelerator. Examples of the other components include a vulcanizing agent, a vulcanization accelerator (except the sulfur-based vulcanization accelerator), a vulcanization rate adjustor, a plasticizer, an anti-aging agent, a filler, and a processing aid.

Examples of the vulcanizing agent include sulfur; a morpholine compound (such as dithiodimorpholine); a thiourea compound; a thiuram compound; a thiazole compound; a guanidine compound; elemental metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium, and oxides (for example, zinc oxide) and hydroxides thereof; 1,4-bis[(t-butyl peroxide)isopropyl]benzene, mixtures of 3-methyl thiazolidinethion-2-thiazole and phenylenedimaleimide, dimethylammonium hydrogen isophthalate, and 1,2-dimercapto-1,3,4-thiadiazole derivatives.

As a vulcanization accelerator other than the sulfur-based vulcanization accelerator, a vulcanization accelerator, which is generally used in the vulcanization of chloroprene rubber, can be used. Examples of the vulcanization accelerator include a guanidine-based vulcanization accelerator and dimethylammonium hydrogen isophthalate.

Examples of the vulcanization rate adjustor include tetramethylthiuram disulfide.

Examples of the plasticizer include vegetable oils such as rape seed oil, linseed oil, castor oil, and palm oil; and petroleum-based plasticizers such as phthalate-based plasticizers, DUP (diundecyl phthalate), DOS (dioctyl sebacate), DOA (dioctyl adipate), ester-based plasticizers, ether ester-based plasticizers, thioether-based plasticizers, aromatic oils, naphthene oils, lubrication oil, petroleum-based process oils, paraffin (paraffin wax), liquid paraffin, vaseline, and petroleum asphalt.

Examples of the anti-aging agent include an ozone anti-aging agent, a phenol-based anti-aging agent, an amine-based anti-aging agent, an acrylate-based anti-aging agent, an imidazole-based anti-aging agent, metal carbamates, waxes, and alkylated diphenylamine (for example, octylated diphenylamine).

Examples of the filler include magnesium oxide, carbon black, silica, clay, talc, and calcium carbonate.

Examples of the processing aid include stearic acid.

<Molded Article and Vulcanized Molded Article>

A molded article of the present embodiment is a molded article of the chloroprene-unsaturated nitrile copolymer composition of the present embodiment and can be obtained by mold processing the chloroprene-unsaturated nitrile copolymer composition of the present embodiment into a shape suitable to purposes. A vulcanized molded article of the present embodiment is a vulcanized molded article of the chloroprene-unsaturated nitrile copolymer composition of the present embodiment. The vulcanized molded article of the present embodiment can be obtained by mold processing the chloroprene-unsaturated nitrile copolymer composition of the present embodiment into a shape suitable to purposes and vulcanizing during molding or after molding, and can also be obtained by mold processing the vulcanizate of the present embodiment into a shape suitable to purposes.

The molding method is not particularly limited. For example, in a case where a molded article is a transmission belt, a conveyor belt, a hose, a wiper, a seal material (such as gasket and packing), a roll, or the like, the molded article can be formed by press molding, injection molding, extrusion molding, or the like.

Since the vulcanized molded article of the present embodiment uses the chloroprene-unsaturated nitrile copolymer composition of the present embodiment, excellent oil resistance can be obtained without impairing scorch time and compression set at a high temperature. Furthermore, according to the vulcanized molded article of the present embodiment, excellent compression set at a high temperature and excellent oil resistance can be obtained while excellent cold resistance (brittle temperature) is obtained. The vulcanized molded article of the present embodiment can be used as a transmission belt, a conveyor belt, a hose, a wiper, a seal material (such as packing and gasket), a roll, an air spring, a vibration-proof material, an adhesive, a boot, a rubberized fabric, a sponge, a rubber lining, and the like. The chloroprene-unsaturated nitrile copolymer composition of the present embodiment can be used for obtaining a vulcanized molded article to be used in these use applications.

(Transmission Belt and Conveyor Belt)

A transmission belt and a conveyor belt are machine components used in a winding transmission device and are parts which transmit a motive power from a driving wheel to a driven wheel. The transmission belt and the conveyor belt are used frequently as being engaged with a pulley set to an axis. Since the transmission belt and the conveyor belt are excellent in light weight, quietness, freedom in changing axis angle, and the like, the transmission belt and the conveyor belt are used widely in all machines such as automobiles, belts for general industrial vehicles, and various conveyor belts. There is also a diversity in the types of belts, and transmission belts such as a plane belt, a timing belt, a V belt, a rib belt, and a round belt; conveyor belts; and the like are utilized differently on the basis of use applications to a machine. In order to efficiently transmit motive power, since a belt stretched under a high tension undergoes repetitive rotational deformation, elastomer materials such as natural rubber (NR), styrene butadiene rubber (SBR), CR, nitrile rubber (NBR), and hydrogenated nitrile rubber (HNBR) are used in conventional transmission belts and conveyor belts. A belt for a machine tool used on a site of construction, or the like is also used in an environment posing an exposure to scattered oils, and thus the belt is demanded to be improved in terms of the oil resistance.

The chloroprene-unsaturated nitrile copolymer composition of the present embodiment can enhance the oil resistance of the transmission belt and the conveyor belt. Thereby, it is possible to produce a belt which can be used even in an environment posing an exposure to scattered oils, or the like, which has been difficult when using a conventional CR.

(Hose)

A hose is a bendable tube and is used in an operation (such as watering) requiring an ability of being bent freely, a portability and a mobility. Furthermore, since the hose is less likely to undergo fatigue fracture due to deformation as compared with a hard tube (such as a metal pipe), the hose is used in a piping at a vibrating position (such as an automobile piping). One of the most general hoses is a rubber hose. The rubber hose is made from NR, CR, EPDM (ethylene propylene diene rubber), SBR, NBR, ACM (acrylic rubber), AEM (ethylene acrylic rubber), HNBR, ECO (epichlorhydrin rubber), FKM (fluorine rubber), or the like, and examples thereof include a hose for water pumping, a hose for oil pumping, a hose for air pumping, a hose for vapor pumping, a hydraulic hose for high pressure, and a hydraulic hose for low pressure. While CR is used mainly in a hydraulic hose for high pressure because of its satisfactory mechanical strength enabling endurance against a high pressure of a fluid, because of its insufficient oil resistance, an inner layer is generally made from NBR. However, it is difficult to bond CR and NBR whose chemical structures are greatly different from each other, and when bonding is insufficient, a problem arises in that interfacial peeling occurs. Accordingly, a material having satisfactory oil resistance is desired. Furthermore, the oil resistance of CR is insufficient as a hose which is brought into direct contact with a non-polar fluid, and thus improvement has been essential.

The chloroprene-unsaturated nitrile copolymer composition of the present embodiment can enhance oil resistance. Thereby, it is possible to produce a hose which is brought into direct contact with a non-polar fluid, which has been difficult when using a conventional CR.

(Wiper)

On a front glass, rear glass, and the like of an automobile, train, aircraft, ship, building machine, and the like, a wiper is usually provided in order to wipe off or remove rain drops, muddy water, oil stain, sea water, ice, snow, dust, and the like depositing on the surface to obtain a clear vision thereby securing safe driving. A wiper blade is fitted on the part where this wiper is brought into contact with the glass surface, and NR, CR, or the like is used as the conventional material for the wiper blade. Since CR has mechanical strength and fatigue durability against repetitive deformation and is excellent in terms of wipeability and the like, CR is used in automobile wipers. However, since the oil resistance of CR is insufficient, when the rubber material is swollen due to an oil stain, a problem arises in that wipeability is reduced. Accordingly, in an environment having substantial oil stains, a wiper blade having an excellent oil resistance has been demanded.

The chloroprene-unsaturated nitrile copolymer composition of the present embodiment can enhance the oil resistance of the wiper. Thereby, it is possible to produce a wiper which can be used even in an environment having substantial oil stains, which has been difficult when using a conventional CR.

(Seal Material)

A seal material is a part which prevents liquid or gas leakage and entry of rain water, rubbishes such as dust, or foreign substances into an inside in a machine, and plays an important role in maintaining the performance of the machine. Examples of the seal material include gaskets used for fixation and packings used at moving parts/movable parts. For the gasket whose seal member is fixed by a bolt and the like, various elastomers suitable to purposes are used as materials for soft gaskets such as O-rings or rubber sheets. Furthermore, the packing is used at an axis of a pump or motor, a rotating part such as a valve movable part, a reciprocal moving part such as a piston, a coupler connecting part, a water stop part of a water faucet, and the like. An oil seal used for sealing a hydraulic instrument at a relatively low pressure or a lubricant secures a sealability with the elasticity of an elastomer. In these elastomer seal materials, CR has a satisfactory mechanical strength and is used in a seal material for a polar gas or liquid. On the other hand, for use in a seal material for a non-polar fluid such as an engine oil or a gear oil, the oil resistance of CR is insufficient, and thus improvement has been essential.

The chloroprene-unsaturated nitrile copolymer composition of the present embodiment can enhance the oil resistance of the seal material. Thereby, it is possible to produce a seal material for a non-polar fluid such as an engine oil or a gear oil, which has been difficult when using a conventional CR.

Examples of the seal material include engine head cover gasket, oil pan gasket, oil seal, lip seal packing, O-ring, transmission seal gasket, crankshaft, camshaft seal gasket, valve stem, power steering seal belt cover seal, a boot member for constant-velocity joint, a rack and pinion boot member, and diaphragm.

(Roll)

A roll is produced by subjecting a metal core such as an iron core to adhesive coating with a rubber, and generally produced by rolling a rubber sheet around a metallic iron core in a swirling pattern. In the roll, rubber materials such as NBR, EPDM, and CR are used depending on the required characteristics in various use applications such as papermaking, manufacture of various metals, printing, general industry, agricultural instruments such as a huller, and food processing. Since CR has a satisfactory mechanical strength capable of tolerating the friction caused by an article being transported, CR is used in a wide range of roll use applications. On the other hand, the oil resistance is insufficient for a roll which is used in an environment causing oil adhesion, such as production of industrial materials and products for steel manufacture or papermaking or the like, and improvement is demanded.

The chloroprene-unsaturated nitrile copolymer composition of the present embodiment can enhance the oil resistance of the roll. Thereby, it is possible to produce a roll which is used in an environment causing oil adhesion, which has been difficult when using a conventional CR.

(Air Spring)

An air spring is a spring device utilizing elasticity of compressed air. The air spring is used in air suspensions and the like for automobiles, buses, trucks, and the like. Examples of the air spring include a bellows type and a sleeve type (one of diaphragm types), and in any cases, the air spring causes a piston to be penetrated into the air chamber so that air pressure can be increased. The air spring is also used in an environment posing an exposure to scattered oils, and thus the air spring is demanded to be improved in terms of the oil resistance.

The chloroprene-unsaturated nitrile copolymer composition of the present embodiment can enhance the oil resistance of the air spring. Thereby, it is possible to produce an air spring which can be used even in an environment having substantial oil stains, which has been difficult when using a conventional CR.

(Vibration-Proof Material)

A vibration-proof material is a rubber which prevents transfer and spreading of a vibration, and used, for example, in use applications for sound insulation or impact cushioning, and prevention of external spreading of a vibration generated from a machine, and the like. For example, the vibration-proof material is used as a constituent material of a torsional damper, an engine mount, a muffler hanger, and the like for absorbing the vibration upon engine drive and preventing noises in automobiles or various vehicles. While a natural rubber having excellent vibration-proof characteristics is widely used in the vibration-proof material, CR is used as a vibration-proof material used in an environment causing oil scattering, such as that for heavy equipment for construction. When the vibration-proof material is swollen as a result of adhesion of an oil, problems arise in that a mechanical strength is deteriorated and breaking easily occurs, which is demanded to be improved.

The chloroprene-unsaturated nitrile copolymer composition of the present embodiment can enhance the oil resistance of the vibration-proof material. Thereby, it is possible to produce a vibration-proof material (a vibration-proof rubber) which can be used even in an environment causing oil scattering, which has been difficult when using a conventional CR.

(Adhesive)

Since CR has contact performance and is excellent in initial adhesive strength, CR is utilized as an adhesive for a wide range of materials such as civil engineering and construction, plywood, furniture, shoes, wet suits, and automobile interior materials. Among these, since CR is excellent in initial adhesive strength and heat-resistant adhesion strength, CR is increasingly demanded to be used as a one-component adhesive for a polyurethane foam widely employed as a material for furniture or automobile interior materials. While the automobile interiors are required to be aesthetically satisfactory, since the oil resistance of CR is insufficient, when droplets of various oils or fuels used in the automobile and the like are adhered to an adherent, interfacial peeling or formation of curved surface of the adherent occurs. Accordingly, an adhesive material having a high oil resistance is desired.

The chloroprene-unsaturated nitrile copolymer composition of the present embodiment can enhance the oil resistance of the adhesive. Thereby, it is possible to produce an adhesive which is more excellent than conventional CR.

(Boot)

A boot is a member in the form of bellows whose outer diameter gradually increases in the direction from one end to the other end, and examples include a boot for a constant-velocity joint cover, a boot for a ball joint cover (dust cover boot), and a boot for a rack and pinion gear, which are used for protecting drive parts of the automobile drive system and the like. Since the boot is required to have physical strength to tolerate a massive deformation, CR is used widely. Recently, since the space allowed for boot movement became smaller in response to advancement of technologies to achieve light weight and compactness of an automobile, the heat removal efficiency is lowered and the heat environment becomes severer. Accordingly, improvement in reliability against non-polar liquids such as oils and greases contained inside the boot under a high temperature atmosphere is desired.

The chloroprene-unsaturated nitrile copolymer composition of the present embodiment can enhance the oil resistance of the boot. Thereby, it is possible to produce a boot which is excellent in reliability against non-polar liquids such as oils and greases contained inside when compared with conventional CR.

(Rubberized Fabric)

A rubberized fabric is a composite material of a rubber and a woven fabric (fiber) made by pasting the rubber onto the fabric, has a strength greater than that of a rubber sheet, and is excellent in water resistance, air tightness, and the like. Utilizing these properties, the rubberized fabric is used widely in various use applications such as rubber boats, tent materials, clothes such as raincoats, water-proof sheets for building, and cushioning materials. As rubber material used in the rubberized fabric, CR, NBR, EPDM, and the like are generally used. Among these, since CR has excellent mechanical strength and weatherability, CR is used widely in fabrics used outdoor such as rubber boats. On the other hand, the oil resistance is insufficient for use in a rubberized fabric sheet material used in an environment where oils are scattered, such as automobiles and construction sites, and improvement is demanded.

The chloroprene-unsaturated nitrile copolymer composition of the present embodiment can enhance the oil resistance of the rubberized fabric. Thereby, it is possible to produce a rubberized fabric which can be used even in an environment where oils are scattered, which has been difficult when using a conventional CR.

(Sponge)

A sponge is a porous material having voids of innumerable fine pores therein. A pore may be in both of the forms of an open cell and a closed cell. In a case where the pores are sufficiently large and continuous to each other, the sponge has a property of absorbing a liquid in a manner of replacement with air inside the pores when immersed in the liquid and has a property of easily releasing the liquid in response to an external force. Furthermore, in a case where the pores are small, the sponge can be used as an excellent cushioning material or heat insulating material. Since CR has excellent mechanical strength and rubber elasticity, CR is used widely in sponges, and used in vibration-proof members, a sponge seal members, wetsuits, shoes, and the like. In any of such use applications, the oil resistance is demanded to be improved in order to prevent swelling deformation, discoloration, and the like due to oils.

The chloroprene-unsaturated nitrile copolymer composition of the present embodiment can enhance the oil resistance of the sponge. Thereby, it is possible to produce a sponge which is less likely to undergo swelling deformation, discoloration, and the like due to oils, which has been difficult when using a conventional CR.

(Rubber Lining)

A rubber lining is used for anticorrosion of a metal by attaching a rubber sheet to a metal surface of a piping, a tank, or the like. Furthermore, the rubber lining is also used in a site requiring electricity resistance or abrasion resistance. NR, CR, EPDM, SBR, and the like are used as a conventional rubber lining, but the oil resistance may be insufficient, and thus the oil resistance is demanded to be improved.

The chloroprene-unsaturated nitrile copolymer composition of the present embodiment can enhance the oil resistance as the rubber lining. Thereby, anticorrosion of a piping or a tank due to oils can be achieved, which has been difficult when using a conventional rubber material.

EXAMPLES

Hereinafter, the present invention will be more specifically described on the basis of Examples. Note that, Examples described below are only typical examples of the present invention and the scope of the present invention is not restricted thereby at all.

<Production of Chloroprene-Unsaturated Nitrile Copolymer>

(Chloroprene-Unsaturated Nitrile Copolymer 1 (Amount of Structural Unit Derived from Acrylonitrile Monomer: 10%))

To a 3-L polymerization tank equipped with a heating/cooling jacket and a stirrer, 37 parts by mass of a chloroprene monomer, 37 parts by mass of an acrylonitrile monomer, 0.5 parts by mass of diethylxanthogen disulfide, 200 parts by mass of pure water, 5.00 parts by mass of potassium rosinate (manufactured by Harima Chemicals, Inc.), 0.40 parts by mass of sodium hydroxide, and 2.0 parts by mass of sodium salt of β-naphthalene sulfonic acid formalin condensate (manufactured by Kao Corporation) were added. Next, 0.1 parts by mass of potassium persulfate was added as a polymerization initiator, and then emulsion polymerization was performed under a nitrogen flow at a polymerization temperature of 40° C. Portionwise addition of the chloroprene monomer was started 20 seconds after polymerization initiation, and was continuously performed by adjusting the portionwise addition flow rate with an electromagnetic valve on the basis of the refrigerant calorimetric change for 10 seconds after polymerization initiation and thereafter by re-adjusting the flow rate every 10 seconds. At the time point when the polymerization rate with respect to the total amount of the chloroprene monomer and the acrylonitrile monomer became 50%, phenothiazine as a polymerization inhibitor was added to terminate the polymerization. Thereafter, by removing the unreacted monomer in the reaction solution under reduced pressure, a chloroprene-acrylonitrile copolymer latex was obtained.

The polymerization rate of the chloroprene-acrylonitrile copolymer latex was calculated from the dry mass of the air-dried chloroprene-acrylonitrile copolymer latex. Specifically, calculation was conducted by the Formula (II) below. In the formula, the solid concentration refers to the concentration [% by mass] of the solid fraction obtained by heating 2 g of the sampled chloroprene-acrylonitrile copolymer latex at 130° C. to remove volatile components such as the solvent (water), volatile chemicals, and the raw materials. The total input amount refers to the total amount of the raw materials, the reagents, and the solvent (water) which had been input into the polymerization tank from the polymerization initiation through a certain time. The non-evaporated residual fraction refers to the mass of the chemicals which did not evaporate under a condition of 130° C. and remained as a solid fraction together with the polymer, among the chemicals and the raw materials which had been input from the polymerization initiation through a certain time. The monomer input amount refers to the total amount of the monomer which was input initially to the polymerization tank and the monomer which was added portionwise from the polymerization initiation through a certain time. Note that, the "monomer" described herein refers to the total amount of the chloroprene monomer and the acrylonitrile monomer.

$$\text{Polymerization rate [\%]} = \{(\text{Total input amount [g]} \times \text{Solid concentration [\% by mass]}/100) - (\text{Non-evaporated residual fraction [g]})\}/\text{Monomer input amount [g]} \times 100 \quad (II)$$

The aforementioned chloroprene-acrylonitrile copolymer latex was adjusted at pH 7.0, and freeze-coagulated on a metal plate cooled to −20° C. so as to be demulsified, thereby obtaining a sheet. This sheet was washed with water and dried for 15 minutes at 130° C., thereby obtaining Chloroprene-acrylonitrile copolymer 1 (Polymer 1) in a solid form.

The amount of the structural unit derived from the acrylonitrile monomer contained in the chloroprene-acrylonitrile copolymer was calculated from the content of the nitrogen atom in the chloroprene-acrylonitrile copolymer. Specifically, the amount of the structural unit derived from the acrylonitrile monomer was calculated by measuring the content of the nitrogen atom in 100 mg of the chloroprene-acrylonitrile copolymer using an element analysis apparatus (SUMIGRAPH 220F: manufactured by Sumika Chemical Analysis Service, Ltd.). The measurement of element analysis was performed under the following conditions. As for the electric furnace temperature, a reaction furnace, a reduction furnace, a column temperature, and a detector temperature were set at 900° C., 600° C., 70° C., and 100° C., respectively, oxygen was flowed as a combustion gas at 0.2 ml/min, and helium was flowed as a carrier gas at 80 ml/min. A calibration curve was made using aspartic acid whose nitrogen content is known (10.52%) as a standard substance. The amount of the structural unit derived from the acrylonitrile monomer in Chloroprene-acrylonitrile copolymer 1 was 10% by mass.

(Chloroprene-Unsaturated Nitrile Copolymer 2 (Amount of Structural Unit Derived from Acrylonitrile Monomer: 3%))

Chloroprene-unsaturated nitrile copolymer 2 was produced by the same procedures as in Chloroprene-unsaturated nitrile copolymer 1 mentioned above, except that the used amount of the chloroprene monomer was changed to 47 parts by mass and the used amount of the acrylonitrile monomer was changed to 20 parts by mass. When the amount of the structural unit derived from the acrylonitrile monomer in Chloroprene-acrylonitrile copolymer 2 was measured by the same procedures as in the aforementioned procedures, the amount of the structural unit was 3% by mass.

(Chloroprene-Unsaturated Nitrile Copolymer 3 (Amount of Structural Unit Derived from Acrylonitrile Monomer: 20%))

Chloroprene-unsaturated nitrile copolymer 3 was produced by the same procedures as in Chloroprene-unsaturated nitrile copolymer 1 mentioned above, except that the used amount of the chloroprene monomer was changed to 17 parts by mass and the used amount of the acrylonitrile monomer was changed to 50 parts by mass. When the amount of the structural unit derived from the acrylonitrile monomer in Chloroprene-acrylonitrile copolymer 3 was measured by the same procedures as in the aforementioned procedures, the amount of the structural unit was 20% by mass.

(Chloroprene-Unsaturated Nitrile Copolymer 4 (Amount of Structural Unit Derived from Acrylonitrile Monomer: 2%))

Chloroprene-unsaturated nitrile copolymer 4 was produced by the same procedures as in Chloroprene-unsaturated nitrile copolymer 1 mentioned above, except that the used amount of the chloroprene monomer was changed to 50 parts by mass and the used amount of the acrylonitrile monomer was changed to 17 parts by mass. When the amount of the structural unit derived from the acrylonitrile monomer in Chloroprene-acrylonitrile copolymer 4 was measured by the same procedures as in the aforementioned procedures, the amount of the structural unit was 2% by mass.

(Chloroprene-Unsaturated Nitrile Copolymer 5 (Amount of Structural Unit Derived from Acrylonitrile Monomer: 25%))

Chloroprene-unsaturated nitrile copolymer 5 was produced by the same procedures as in Chloroprene-unsaturated nitrile copolymer 1 mentioned above, except that the used amount of the chloroprene monomer was changed to 10 parts by mass and the used amount of the acrylonitrile monomer was changed to 57 parts by mass. When the amount of the structural unit derived from the acrylonitrile monomer in Chloroprene-acrylonitrile copolymer 5 was measured by the same procedures as in the aforementioned procedures, the amount of the structural unit was 25% by mass.

Experiment A: Evaluation of Chloroprene-Acrylonitrile Copolymer Composition (Production of Chloroprene-Acrylonitrile Copolymer Composition)

The chloroprene-acrylonitrile copolymer and each compound presented in Table 1 were kneaded with an 8-inch open roll, thereby obtaining a chloroprene-acrylonitrile copolymer composition. In the table, "phr" means "part(s) by mass". The used amount of zinc oxide presented in Table 1 is the total amount of zinc oxides No. 2.

Main compounds presented in Table 1 are as follows.

Diisopropylxanthogen disulfide: manufactured by SANSHIN CHEMICAL INDUSTRY CO., LTD., SANBIT DIX Diethylxanthogen disulfide: manufactured by Sigma-Aldrich, Inc., O, O-diethyldithiobis-(thioformate)

3-Methylthiazolidine-2-thione: manufactured by LANXESS, RHENOGRAN MTT-80

1,1,3-Trimethyl thiourea: manufactured by OUCHI SHINKO CHEMICAL INDUSTRIAL CO., LTD., NOCCELER TMU Ethylene thiourea: manufactured by Kawaguchi Chemical Industry Co., LTD., ACCEL 22S PERBUTYL P-40: manufactured by NOF CORPORATION, PERBUTYL P-40

Stearic acid: manufactured by New Japan Chemical Co., Ltd., STEARIC ACID 50S

Heat-resistant anti-aging agent (Octamine): manufactured by OUCHI SHINKO CHEMICAL INDUSTRIAL CO., LTD., NOCRAC AD-F Heat-resistant anti-aging agent (TNP): manufactured by OUCHI SHINKO CHEMICAL INDUSTRIAL CO., LTD., NOCRAC TNP Heat-resistant anti-aging agent (6C): manufactured by OUCHI SHINKO CHEMICAL INDUSTRIAL CO., LTD., NOCRAC 6C Magnesium oxide (#150): manufactured by Kyowa Chemical Industry Co., Ltd., KYOWAMAG (registered trademark) 150

Carbon black (ASTM N550): manufactured by Asahi Carbon Co., Ltd., Asahi #65

Carbon black (ASTM N990): manufactured by ABBEY CHEMICALS, Unithermal MT-N990

Naphthene oil: manufactured by New Japan Chemical Co., Ltd., NP-24

Rape seed oil: manufactured by Heiwasiryo K.K., Rape seed oil

Special wax: manufactured by OUCHI SHINKO CHEMICAL INDUSTRIAL CO., LTD., SUNNOC

Zinc oxide: manufactured by SAKAI CHEMICAL INDUSTRY CO., LTD., Zinc Oxide No. 2

Tetramethylthiuram disulfide: manufactured by OUCHI SHINKO CHEMICAL INDUSTRIAL CO., LTD., NOCCELER TET (Production of Vulcanized Molded Article)

The aforementioned chloroprene-acrylonitrile copolymer composition was subjected to press vulcanization under a condition of 170° C.×20 minutes to produce a sheet-shaped vulcanized molded article having a thickness of 2 mm.

(Evaluation of Vulcanized Molded Article)

The following evaluations were performed for the aforementioned vulcanized molded article. Evaluation results are presented in Table 1.

(1) Scorch Time

A Mooney scorch test at 125° C. was performed according to JIS K6300-1 to measure "scorch time t5". Taking into consideration of actual product usage, a case where the "scorch time t5" is 35 minutes or longer was evaluated as "A", a case where the "scorch time t5" is 25 minutes or longer and shorter than 35 minutes was evaluated as "B", a case where the "scorch time t5" is 15 minutes or longer and shorter than 25 minutes was evaluated as "C", and a case where the "scorch time t5" is shorter than 15 minutes was evaluated as "D". "A", "B", or "C" was evaluated as "passing". The "scorch time t5" refers to a time (min) necessary for increasing the viscosity of the chloroprene-acrylonitrile copolymer composition from the minimum viscosity to 5% when the scorch time is measured.

(2) Compression Set

Evaluation of compression set at 130° C. for 72 hours was performed according to JIS K6262. A case where the compression set is less than 30% was evaluated as "A", a case where the compression set is 30% or more and less than 35% was evaluated as "B", a case where the compression set is 35% or more and less than 40% was evaluated as "C", and a case where the compression set is 40% or more was evaluated as "D". "A", "B", or "C" was evaluated as "passing".

(3) Oil Resistance

After immersing in ASTM No. 3 Oil (manufactured by Japan Sun Oil Company, Ltd., IRM903) at 100° C. for 72 hours, an immersion test was performed according to JIS K6258, and an oil resistance test (measurement of a mass change rate) was performed. A case where the mass change rate is less than 20% was evaluated as "A", a case where the mass change rate is 20% or more and less than 35% was evaluated as "B", a case where the mass change rate is 35% or more and less than 50% was evaluated as "C", and a case where the mass change rate is 50% or more was evaluated as "D". "A", "B", or "C" was evaluated as "passing".

(4) Cold Resistance (Brittle Temperature)

The brittle temperature is a value that is an index for low-temperature properties, and was measured according to JIS K6261. Specifically, the brittle temperature was calculated by applying a predetermined impact blow to a cantilever strip test piece put in a test tank set at a constant temperature, measuring the number of breakages thereof at each temperature, and substituting this value into a predetermined calculation formula. As a result, a case where the brittle temperature is lower than −30° C. was evaluated as "A", a case where the brittle temperature is −30° C. or higher and lower than −20° C. was evaluated as "B", a case where the brittle temperature is −20° C. or higher and lower than −10° C. was evaluated as "C", and a case where the brittle temperature is −10° C. or higher was evaluated as "D". "A", "B", or "C" was evaluated as "passing".

TABLE 1

| | | | Unit | Example 1 | 2 | 3 | 4 | 5 | 6 | 7 | 8 | 9 | 10 |
|---|---|---|---|---|---|---|---|---|---|---|---|---|---|
| Composition | Chloroprene-acrylonitrile copolymer | Used amount | phr | 100 | 100 | 100 | 100 | 100 | 100 | 100 | 100 | 100 | 100 |
| | | Acrylonitrile monomer unit amount | % | 10 | 10 | 10 | 10 | 10 | 10 | 10 | 10 | 10 | 10 |
| | Diisopropylxanthogen disulfide | | phr | 0.5 | 0.5 | 0.5 | 0.5 | 0.5 | 0.5 | 0.5 | 1 | 2 | 0.05 |
| | Diethylxanthogen disulfide | | phr | | | | | | | | | | |
| | 3-Methylthiazolidine-2-thione | | phr | | | 1 | 1 | 3 | 5 | | 1 | 1 | 1 |
| | Trimethyl thiourea | | phr | | | | | | | 1 | | | |
| | Ethylene thiourea | | phr | | | | | | | | 1 | | |
| | PERBUTYL P-40 | | phr | 2 | 2 | | | | | | | | |
| | Stearic acid | | phr | 1 | 1 | 1 | 1 | 1 | 1 | 1 | 1 | 1 | 1 |
| | Heat-resistant anti-aging agent (Octamine) | | phr | 4 | 4 | 4 | 4 | 4 | 4 | 4 | 4 | 4 | 4 |
| | Heat-resistant anti-aging agent (TNP) | | phr | 2 | 2 | 2 | 2 | 2 | 2 | 2 | 2 | 2 | 2 |
| | Heat-resistant anti-aging agent (6C) | | phr | 2 | 2 | 2 | 2 | 2 | 2 | 2 | 2 | 2 | 2 |
| | Magnesium oxide (#150) | | phr | 4 | 4 | 4 | 4 | 4 | 4 | 4 | 4 | 4 | 4 |
| | Carbon black (ASTM N550) | | phr | 40 | 40 | 40 | 40 | 40 | 40 | 40 | 40 | 40 | 40 |
| | Carbon black (ASTM N990) | | phr | 20 | 20 | 20 | 20 | 20 | 20 | 20 | 20 | 20 | 20 |
| | Naphthene oil | | phr | 15 | 15 | 15 | 15 | 15 | 15 | 15 | 15 | 15 | 15 |
| | Rape seed oil | | phr | 12 | 12 | 12 | 12 | 12 | 12 | 12 | 12 | 12 | 12 |
| | Special wax | | phr | 2 | 2 | 2 | 2 | 2 | 2 | 2 | 2 | 2 | 2 |
| | Zinc oxide | | phr | 5 | 5 | 5 | 5 | 5 | 5 | 5 | 5 | 5 | 5 |
| | Tetramethylthiuram disulfide | | phr | | 0.3 | 0.3 | 0.3 | 0.3 | 0.3 | 0.3 | 0.3 | 0.3 | 0.3 |
| Physical propetties | Scorch time (ML at 125° C., t5) | | | B | C | B | B | C | C | C | A | A | C |
| | Compression set (130° C. × 72 hr) | | | B | B | B | B | C | B | C | C | C | C |
| | Oil resistance (IRM903 100° C. × 72 hr) | | | B | B | B | B | B | B | B | B | B | B |
| | Brittle temperature | | | B | B | B | B | B | B | B | B | B | B |

| | | | Unit | Example 11 | 12 | 13 | 14 | Comparative Example 1 | 2 | 3 | 4 |
|---|---|---|---|---|---|---|---|---|---|---|---|
| Composition | Chloroprene-acrylonitrile copolymer | Used amount | phr | 100 | 100 | 100 | 100 | 100 | 100 | 100 | 100 |
| | | Acrylonitrile monomer unit amount | % | 10 | 10 | 3 | 20 | 10 | 10 | 2 | 25 |
| | Diisopropylxanthogen disulfide | | phr | | | 0.5 | 0.5 | | 5 | 0.5 | 0.5 |
| | Diethylxanthogen disulfide | | phr | 0.5 | 1 | | | | | | |
| | 3-Methylthiazolidine-2-thione | | phr | 1 | 1 | 1 | 1 | 1 | 1 | 1 | 1 |
| | Trimethyl thiourea | | phr | | | | | | | | |
| | Ethylene thiourea | | phr | | | | | | | | |
| | PERBUTYL P-40 | | phr | | | | | | | | |
| | Stearic acid | | phr | 1 | 1 | 1 | 1 | 1 | 1 | 1 | 1 |
| | Heat-resistant anti-aging agent (Octamine) | | phr | 4 | 4 | 4 | 4 | 4 | 4 | 4 | 4 |
| | Heat-resistant anti-aging agent (TNP) | | phr | 2 | 2 | 2 | 2 | 2 | 2 | 2 | 2 |
| | Heat-resistant anti-aging agent (6C) | | phr | 2 | 2 | 2 | 2 | 2 | 2 | 2 | 2 |
| | Magnesium oxide (#150) | | phr | 4 | 4 | 4 | 4 | 4 | 4 | 4 | 4 |
| | Carbon black (ASTM N550) | | phr | 40 | 40 | 40 | 40 | 40 | 40 | 40 | 40 |
| | Carbon black (ASTM N990) | | phr | 20 | 20 | 20 | 20 | 20 | 20 | 20 | 20 |

TABLE 1-continued

|  |  |  |  |  |  |  |  |  |  |  |
|---|---|---|---|---|---|---|---|---|---|---|
|  | Naphthene oil | phr | 15 | 15 | 15 | 15 | 15 | 15 | 15 | 15 |
|  | Rape seed oil | phr | 12 | 12 | 12 | 12 | 12 | 12 | 12 | 12 |
|  | Special wax | phr | 2 | 2 | 7 | 7 | 7 | 7 | 7 | 7 |
|  | Zinc oxide | phr | 5 | 5 | 5 | 5 | 5 | 5 | 5 | 5 |
|  | Tetramethylthiuram disulfide | phr | 0.3 | 0.3 | 0.3 | 0.3 | 0.3 | 0.3 | 0.3 | 0.3 |
| Physical | Scorch time (ML at 125° C., t5) |  | B | B | A | B | C | A | A | B |
| propetties | Compression set (130° C. × 72 hr) |  | C | C | A | C | D | D | A | D |
|  | Oil resistance (IRM903 100° C. × 72 hr) |  | B | B | C | A | B | B | D | A |
|  | Brittle temperature |  | B | B | A | C | B | B | A | D |

From the results presented in Table 1, it was found that, according to the chloroprene-unsaturated nitrile copolymer compositions of Examples, a vulcanizate and a vulcanized molded article, which are excellent in oil resistance, can be obtained without impairing scorch time and compression set at a high temperature while obtaining excellent brittle temperature. Since this vulcanized molded article has these properties, the vulcanized molded article can be suitably used as a molded article such as a transmission belt, a conveyor belt, a hose, a wiper, a seal material (such as packing and gasket), a roll, an air spring, a vibration-proof material, an adhesive, a boot, a rubberized fabric, a sponge, and a rubber lining.

Experiment B: Evaluation of
Chloroprene-Acrylonitrile Copolymer Composition (Production of Chloroprene-Acrylonitrile Copolymer Composition)

The chloroprene-acrylonitrile copolymer and each compound presented in Table 2 were kneaded with an 8-inch open roll, thereby obtaining a chloroprene-acrylonitrile copolymer composition. In the table, "phr" means "part(s) by mass". The used amount of zinc oxide presented in Table 2 is the total amount of zinc oxides No. 2.

Main compounds presented in Table 2 are as follows.

Diisopropylxanthogen disulfide: manufactured by SANSHIN CHEMICAL INDUSTRY CO., LTD., SANBIT DIX Diethylxanthogen disulfide: manufactured by Sigma-Aldrich, Inc., O, O-diethyldithiobis-(thioformate)

3-Methylthiazolidine-2-thione: manufactured by LANXESS, RHENOGRAN MTT-80

1,1,3-Trimethyl thiourea: manufactured by OUCHI SHINKO CHEMICAL INDUSTRIAL CO., LTD., NOCCELER TMU Ethylene thiourea: manufactured by Kawaguchi Chemical Industry Co., LTD., ACCEL 22S PERBUTYL P-40: manufactured by NOF CORPORATION, PERBUTYL P-40

Stearic acid: manufactured by New Japan Chemical Co., Ltd., STEARIC ACID 50S

Anti-aging agent PA: manufactured by OUCHI SHINKO CHEMICAL INDUSTRIAL CO., LTD., NOCRAC PA Carbon black (ASTM N762): manufactured by Asahi Carbon Co., Ltd., Asahi #50U Carbon black (ASTM N550): manufactured by Asahi Carbon Co., Ltd., Asahi #65

Petroleum-based process oil: manufactured by Idemitsu Kosan Co., Ltd., Diana Process Oil Paraffin wax: manufactured by Nippon Seiro Co., Ltd., Paraffin 130° F.

Vaseline: manufactured by Sonneborn LLC., White protopet 1S

Magnesium oxide: manufactured by Kyowa Chemical Industry Co., Ltd., KYOWAMAG (registered trademark) 150

Zinc oxide: manufactured by SAKAI CHEMICAL INDUSTRY CO., LTD., Zinc Oxide No. 2

Tetramethylthiuram disulfide: manufactured by OUCHI SHINKO CHEMICAL INDUSTRIAL CO., LTD., NOCCELER TET (Production and Evaluation of Vulcanized Molded Article)

The aforementioned chloroprene-acrylonitrile copolymer composition was subjected to press vulcanization under a condition of 160° C.×20 minutes to produce a sheet-shaped vulcanized molded article having a thickness of 2 mm. The scorch time, the compression set, the oil resistance, and the brittle temperature, which have been mentioned above, of this vulcanized molded article were evaluated. Evaluation results are presented in Table 2.

TABLE 2

|  |  |  |  | Example |  |  |  |  |  |  |  |  |  |
|---|---|---|---|---|---|---|---|---|---|---|---|---|---|
|  |  |  | Unit | 1 | 2 | 3 | 4 | 5 | 6 | 7 | 8 | 9 | 10 |
| Composition | Chloroprene-acrylonitrile copolymer | Used amount | phr | 100 | 100 | 100 | 100 | 100 | 100 | 100 | 100 | 100 | 100 |
|  |  | Acrylonitrile monomer unit amount | % | 3 | 3 | 10 | 10 | 10 | 10 | 10 | 10 | 10 | 10 |
|  | Diisopropylxanthogen disulfide |  | phr | 0.5 | 0.5 | 0.5 | 0.5 | 0.5 | 0.5 | 0.5 | 1 | 2 | 0.05 |
|  | Diethylxanthogen disulfide |  | phr |  |  |  |  |  |  |  |  |  |  |
|  | 3-Methylthiazolidine-2-thione |  | phr |  | 1 | 1 | 3 | 5 |  |  | 1 | 1 | 1 |
|  | Trimethyl thiourea |  | phr |  |  |  |  |  | 1 |  |  |  |  |
|  | Ethylene thiourea |  | phr |  |  |  |  |  |  | 1 |  |  |  |
|  | PERBUTYL P-40 |  | phr | 2 | 2 |  |  |  |  |  |  |  |  |
|  | Stearic acid |  | phr | 0.5 | 0.5 | 0.5 | 0.5 | 0.5 | 0.5 | 0.5 | 0.5 | 0.5 | 0.5 |
|  | Anti-aging agent PA |  | phr | 1 | 1 | 1 | 1 | 1 | 1 | 1 | 1 | 1 | 1 |
|  | Carbon black (ASTM N762) |  | phr | 30 | 30 | 30 | 30 | 30 | 30 | 30 | 30 | 30 | 30 |
|  | Carbon black (ASTM N550) |  | phr | 20 | 20 | 20 | 20 | 20 | 20 | 20 | 20 | 20 | 20 |
|  | Petroleum-based process oil |  | phr | 12 | 12 | 12 | 12 | 12 | 12 | 12 | 12 | 12 | 12 |
|  | Paraffin wax |  | phr | 1.5 | 1.5 | 1.5 | 1.5 | 1.5 | 1.5 | 1.5 | 1.5 | 1.5 | 1.5 |
|  | Vaseline |  | phr | 1.5 | 1.5 | 1.5 | 1.5 | 1.5 | 1.5 | 1.5 | 1.5 | 1.5 | 1.5 |

TABLE 2-continued

| | | | | | | | | | | | | | |
|---|---|---|---|---|---|---|---|---|---|---|---|---|---|
| | Magnesium oxide | | phr | 4 | 4 | 4 | 4 | 4 | 4 | 4 | 4 | 4 | 4 |
| | Zinc oxide | | phr | 5 | 5 | 5 | 5 | 5 | 5 | 5 | 5 | 5 | 5 |
| | Tetramethylthiuram disulfide | | phr | | 0.5 | 0.5 | 0.5 | 0.5 | 0.5 | 0.5 | 0.5 | 0.5 | 0.5 |
| Physical properties | Scorch time (ML at 125° C., t5) | | | B | C | A | B | C | C | C | A | A | B |
| | Compression set (130° C. × 72 hr) | | | B | B | A | B | B | A | B | B | C | B |
| | Oil resistance (IRM903 100° C. × 72 hr) | | | B | B | B | B | B | B | B | B | B | B |
| | Brittle temperature | | | B | B | B | B | B | B | B | B | B | B |

| | | | | | Example | | | | Comparative Example | | | |
|---|---|---|---|---|---|---|---|---|---|---|---|---|
| | | | Unit | 11 | 12 | 13 | 14 | 1 | 2 | 3 | 4 |
| Composition | Chloroprene-acrylonitrile copolymer | Used amount | phr | 100 | 100 | 100 | 100 | 100 | 100 | 100 | 100 |
| | | Acrylonitrile monomer unit amount | % | 10 | 10 | 3 | 20 | 10 | 10 | 2 | 25 |
| | Diisopropylxanthogen disulfide | | phr | | | 0.5 | 0.5 | | 5 | 0.5 | 0.5 |
| | Diethylxanthogen disulfide | | phr | 0.5 | 1 | | | | | | |
| | 3-Methylthiazolidine-2-thione | | phr | 1 | 1 | 1 | 1 | 1 | 1 | 1 | 1 |
| | Trimethyl thiourea | | phr | | | | | | | | |
| | Ethylene thiourea | | phr | | | | | | | | |
| | PERBUTYL P-40 | | phr | | | | | | | | |
| | Stearic acid | | phr | 0.5 | 0.5 | 0.5 | 0.5 | 0.5 | 0.5 | 0.5 | 0.5 |
| | Anti-aging agent PA | | phr | 1 | 1 | 1 | 1 | 1 | 1 | 1 | 1 |
| | Carbon black (ASTM N762) | | phr | 30 | 30 | 30 | 30 | 30 | 30 | 30 | 30 |
| | Carbon black (ASTM N550) | | phr | 20 | 20 | 20 | 20 | 20 | 20 | 20 | 20 |
| | Petroleum-based process oil | | phr | 12 | 12 | 12 | 12 | 12 | 12 | 12 | 12 |
| | Paraffin wax | | phr | 1.5 | 1.5 | 1.5 | 1.5 | 1.5 | 1.5 | 1.5 | 1.5 |
| | Vaseline | | phr | 1.5 | 1.5 | 1.5 | 1.5 | 1.5 | 1.5 | 1.5 | 1.5 |
| | Magnesium oxide | | phr | 4 | 4 | 4 | 4 | 4 | 4 | 4 | 4 |
| | Zinc oxide | | phr | 5 | 5 | 5 | 5 | 5 | 5 | 5 | 5 |
| | Tetramethylthiuram disulfide | | phr | 0.5 | 0.5 | 0.5 | 0.5 | 0.5 | 0.5 | 0.5 | 0.5 |
| Physical properties | Scorch time (ML at 125° C., t5) | | | B | B | A | B | C | A | A | B |
| | Compression set (130° C. × 72 hr) | | | B | C | A | C | D | D | A | D |
| | Oil resistance (IRM903 100° C. × 72 hr) | | | B | B | C | A | B | B | D | A |
| | Brittle temperature | | | B | B | A | C | B | B | A | D |

From the results presented in Table 2, it was found that, according to the chloroprene-unsaturated nitrile copolymer compositions of Examples, a vulcanizate and a vulcanized molded article, which are excellent in oil resistance, can be obtained without impairing scorch time and compression set at a high temperature while obtaining excellent brittle temperature. Since this vulcanized molded article has these properties, the vulcanized molded article can be suitably used as a molded article such as a transmission belt, a conveyor belt, a hose, a wiper, a seal material (such as packing and gasket), a roll, an air spring, a vibration-proof material, an adhesive, a boot, a rubberized fabric, a sponge, and a rubber lining.

The invention claimed is:

1. A chloroprene-unsaturated nitrile copolymer composition comprising 100 parts by mass of a chloroprene-unsaturated nitrile copolymer comprising 3 to 20% by mass of a structural unit derived from an unsaturated nitrile monomer, 0.05 to 2.0 parts by mass of a xanthogen compound comprising diisopropylxanthogen disulfide, and more than 0.75 part by mass of a sulfur-based vulcanization accelerator comprising 3-methylthiazolidine-2-thione.

2. The chloroprene-unsaturated nitrile copolymer composition according to claim 1, wherein a content of the sulfur-based vulcanization accelerator is more than 0.75 part by mass and 5 parts by mass or less with respect to 100 parts by mass of the chloroprene-unsaturated nitrile copolymer.

3. The chloroprene-unsaturated nitrile copolymer composition according to claim 1, wherein the sulfur-based vulcanization accelerator further comprises 1,1,3-trimethyl thiourea and/or ethylene thiourea.

4. A vulcanized molded article of the chloroprene-unsaturated nitrile copolymer composition according to claim 1.

5. A vulcanizate of the chloroprene-unsaturated nitrile copolymer composition according to claim 1.

6. The chloroprene-unsaturated nitrile copolymer composition according to claim 1, wherein the chloroprene-unsaturated nitrile copolymer comprises a structural unit derived from acrylonitrile.

7. The chloroprene-unsaturated nitrile copolymer composition according to claim 1, wherein the chloroprene-unsaturated nitrile copolymer comprises 9 to 17% by mass of the structural unit derived from an unsaturated nitrile monomer.

8. The chloroprene-unsaturated nitrile copolymer composition according to claim 1, wherein an amount of a structural unit derived from a chloroprene monomer is 83 to 91% by mass on the basis of the total amount of the chloroprene-unsaturated nitrile copolymer.

9. The chloroprene-unsaturated nitrile copolymer composition according to claim 1, wherein the xanthogen compound further comprises diethylxanthogen disulfide.

10. The chloroprene-unsaturated nitrile copolymer composition according to claim 1, wherein a content of the xanthogen compound is 0.1 to 2.0 parts by mass with respect to 100 parts by mass of the chloroprene-unsaturated nitrile copolymer.

11. The chloroprene-unsaturated nitrile copolymer composition according to claim 1, wherein a content of the xanthogen compound is 0.3 to 1.0 part by mass with respect to 100 parts by mass of the chloroprene-unsaturated nitrile copolymer.

12. The chloroprene-unsaturated nitrile copolymer composition according to claim 1, wherein the sulfur-based vulcanization accelerator comprises 1,1,3-trimethyl thiourea.

13. The chloroprene-unsaturated nitrile copolymer composition according to claim 1, wherein the sulfur-based vulcanization accelerator comprises ethylene thiourea.

14. The chloroprene-unsaturated nitrile copolymer composition according to claim 1, wherein a content of the sulfur-based vulcanization accelerator is more than 0.75 part by mass and 3.0 parts by mass or less with respect to 100 parts by mass of the chloroprene-unsaturated nitrile copolymer.

15. The chloroprene-unsaturated nitrile copolymer composition according to claim 1, wherein a content of the sulfur-based vulcanization accelerator is 1.0 to 2.0 parts by mass with respect to 100 parts by mass of the chloroprene-unsaturated nitrile copolymer.

16. The chloroprene-unsaturated nitrile copolymer composition according to claim 1, comprising 100 parts by mass of a chloroprene-unsaturated nitrile copolymer comprising more than 8% by mass and 20% or less of a structural unit derived from an unsaturated nitrile monomer.

* * * * *